United States Patent
Kondo (10) Patent No.: US 7,545,420 B2
(45) Date of Patent: Jun. 9, 2009

(54) IMAGE SENSING APPARATUS, IMAGE SENSING METHOD, AND PROGRAM

(75) Inventor: Kenichi Kondo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1072 days.

(21) Appl. No.: 10/787,623

(22) Filed: Feb. 25, 2004

(65) Prior Publication Data

US 2004/0169896 A1    Sep. 2, 2004

(30) Foreign Application Priority Data

Feb. 27, 2003    (JP) ............................. 2003-051103

(51) Int. Cl.
*H04N 9/64* (2006.01)
(52) U.S. Cl. .................................... 348/248
(58) Field of Classification Search ................ 348/249, 348/248; 358/482
See application file for complete search history.

(56) References Cited

U.S. PATENT DOCUMENTS

| | | | |
|---|---|---|---|
| 5,691,773 A * | 11/1997 | Wang et al. ................. 348/249 |
| 5,940,125 A | 8/1999 | Suganuma |
| 6,266,087 B1 * | 7/2001 | Hynecek et al. ............. 348/249 |
| 6,356,713 B1 | 3/2002 | Sato |
| 6,809,763 B1 * | 10/2004 | Yoshida ...................... 348/248 |
| 2002/0012065 A1 * | 1/2002 | Watanabe ................... 348/364 |
| 2002/0080247 A1 * | 6/2002 | Takahashi et al. ........... 348/229 |
| 2003/0107662 A1 * | 6/2003 | Suzuki ....................... 348/249 |

FOREIGN PATENT DOCUMENTS

| | | |
|---|---|---|
| CN | 1280311 | 1/2001 |
| JP | 2001-024943 | 1/2001 |

* cited by examiner

*Primary Examiner*—Jason Chan
*Assistant Examiner*—Joel Fosselman
(74) *Attorney, Agent, or Firm*—Cowan, Liebowitz & Latman, P.C.

(57) ABSTRACT

A purpose of this invention is to execute proper smear correction corresponding to the image sensing purpose or condition without degrading the image quality. To achieve this purpose, the smear line signal of an image sensing signal output from a solid-state image sensing element (4) is stored in a smear line memory (7). The value of the smear line signal is limited by a limiting circuit (8), and smear correction is performed for the image sensing signal on the basis of the limited value.

14 Claims, 7 Drawing Sheets

IMAGE SENSING APPARATUS, IMAGE SENSING METHOD, AND PROGRAM

FIELD OF THE INVENTION

The present invention relates to an image sensing apparatus, image sensing method, and program which sense an image by using a solid-state image sensing element.

BACKGROUND OF THE INVENTION

Recently, digital video movie cameras (DVC) and digital still cameras (DSC) are beginning to prevail. The digital multi-pixel processing has made available DSCs of several hundred pixels. DVCs equipped with an image sensing element which is formed by more than 1,000,000 pixels and has a function of photographing even a still image are commercially available. Digital processing enables various corrections which are difficult in the prior art. For example, corrections such as scratch and noise corrections of an image sensing element can be generally done.

Digitization and multi-pixel image sensing elements give a still image photographing function to DVCs and a movie function to DSCs; the functions of DVCs and DSCs are coming close to each other. Recent cell phones are equipped with even a still image/movie image capture function, and these image input means have greatly been developed.

In this situation, some problems which were solved before have become serious again. One of these problems is smear. Smear has existed since solid-state image sensing elements became available. As is well known, smear occurs when incoming light during signal charge transfer serves as a false signal to generate a stripe, degrading the image quality. When the smear amount is large, even a dark portion vertically adjacent to a portion having high brightness (e.g., a general landscape having a sky image at an upper portion and a mountain or building at a lower portion) flares without any strong light source, and may even become reddish, degrading the image quality. This is because light incident upon transferring a signal from a high-brightness portion leaks in transferring a signal from a dark portion, and a false signal is added to the signal from the dark portion.

As a measure against smear, the history of the sensor structure has shifted from frame transfer (FT) CCDs to interline transfer (IT) CCDs. The IT-CCD is resistant to smear, and thus has become the mainstream of image sensing elements. In the FT-CCD, the pixel has both the signal storage function and transfer function. To the contrary, IT-CCDs have the functional structures of a photodiode (PD) having only the signal storage function and a vertical transfer CCD (V-CCD) having only the transfer function. Regardless of these advantages of IT-CCDs, IT-CCDs and FT-CCDs have equally been adopted at the beginning because IT-CCDs also suffer smear due to the mixing of light incident from the PD in the V-CCD. To reduce smear, the pixel structure of the sensor has constantly been improved to reduce leakage of light from the PD to the V-CCD.

However, smear which has been suppressed to a practically negligible level by continuous improvements is on the rise recently. Smear stands out particularly in EVF moving images and movie images obtained by multi-pixel DSCs. The main factor of this phenomenon is attributed to the fact that the protection against leakage of light from the PD region to the V-CCD region degrades due to a small cell size of the sensor along with the multi-pixel structure, and in the use of the DSC, pixel subtraction is executed for EVF moving images and movie images to increase the incident light quantity during the read time much more than that in the DVC sensor or the like. As for cell downsizing, even DVC products equipped with the still image capturing function require image sensing elements having more than 1,000,000 pixels. The pixel must be downsized, similar to the DSC, the smear protection degrades, and needs for a smear measure rise.

Under the present circumstances (improvements of the correction ability against various drawbacks caused by an increase in smear in the image sensing element and digitization), demands have arisen for realizing conventionally known smear correction. For example, Japanese Patent Laid-Open No. 2001-24943 proposes conventionally known smear correction and a measure against its problem.

In conventional smear correction, the V-CCD is operated by transfer stages larger in number than the vertical PD, and smear correction of each signal line is done using only information (smear line data) on smear superposed on a dummy line which does not output any PD signal. In this case, the number of transfer stages is set larger by several stages so as to keep several dummy lines. A plurality of dummy lines are added and divided by the number of lines to average the data. This reduces noise contained in smear line data. However, the read time is prolonged by the number of dummy lines, and the number of dummy lines cannot be increased so much. Dummy lines may be formed by shielding the upper PD portion of the image sensing element from light, instead of increasing the number of transfer stages.

In the following description, the type of smear correction is not classified by the dummy line formation method. Smear line data or a smear line signal means smear correction data having 1-line information by averaging.

Conventional smear correction will be summed up and described. The smear amount in columns uniformly appear in all lines, and an output of only a smear component is obtained from a dummy line which does not receive any light. The obtained smear line information is used in correction to obtain an image free from any smear by subtracting smear data of the same column from signal data of each signal line. This correction is subtraction:

$$Sout(i,j)=Sccd(i,j)-Sm(i) \quad (1)$$

Sout: data after smear correction

Sccd: data before smear correction

Sm: smear data i: horizontal address j: vertical address

However, this correction method decreases saturation by the smear subtraction amount. For example, let AD be the CCD output for a 10-bit AD. At this time, when the smear data value is 50, the signal is saturated at 1024−50=974.

Figure 7:
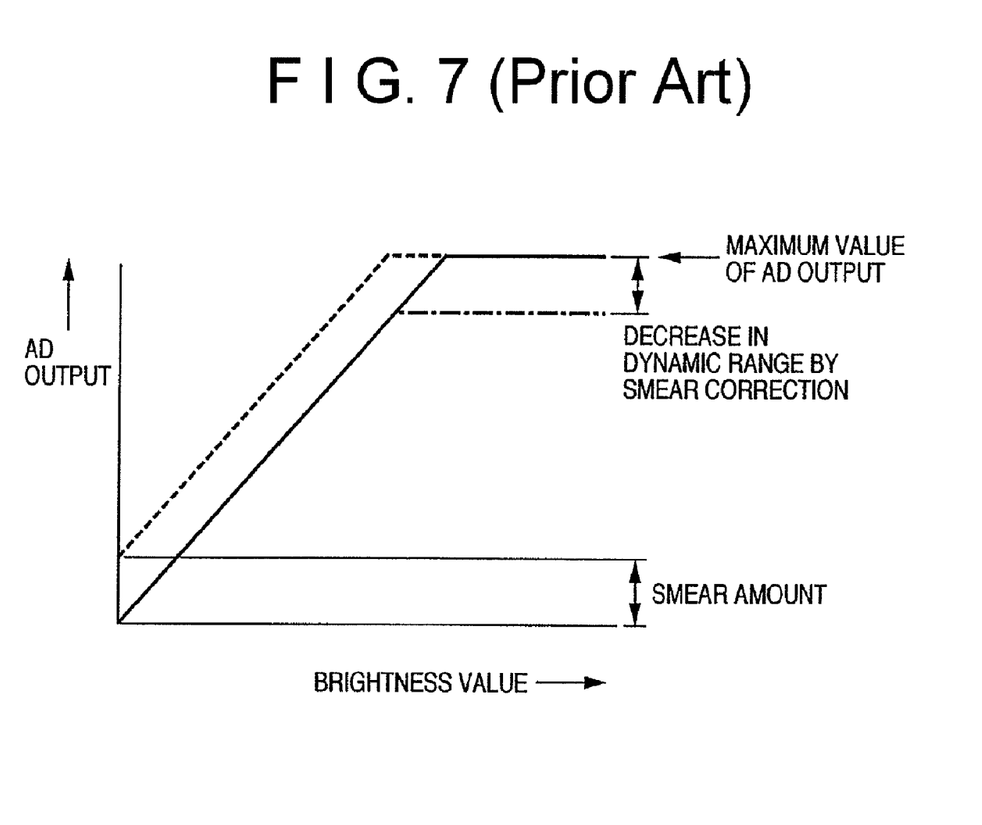
FIG. 7 is a graph for explaining conventional smear correction.

This state is shown in FIG. 7. The solid line in FIG. 7 represents the input/output relationship without any smear, the dotted line represents the input/output relationship of a column having smear, and the chain line represents the input/output relationship after smear correction. The smear amount and a decrease in dynamic range upon correction are equal to each other.

This problem has also been pointed out in Japanese Patent Laid-Open No. 2001-24943 described above. This reference states that a portion having high saturation brightness becomes gray in a line having a large smear correction amount, resulting in an unnatural image. This phenomenon actually occurs. As a measure, this proposal describes a correction method:

$$Sout(i,j)=(Sccd(i,j)-Sm(i))\times Sat/(Sat-Sm(i))$$

Sat: saturation value

When the smear amount increases, an offset is added. If the smear amount increases further more, no correction is performed. As a result, correction becomes linear without any decrease in saturation.

In this correction, the gain changes between columns, and a stripe is generated in an image, resulting in a low-quality image. In signal processing after smear correction, gamma correction is done, and especially the gain increases at low brightness. This further enhances the stripe at the dark portion of the image.

This proposal provides a method of changing the gain in accordance with the smear level and a method of inhibiting any correction for a larger smear amount. However, correction is done on the basis of information of each column, further increases the difference between columns, and presents a new cause for image quality degradation.

To prevent such new image quality degradation, clipping at the maximum smear value which is not preferable in the embodiment of this proposal is an effective means. However, direct use of this means causes a problem that "the image sensing range narrows to make the entire image dark owing to removal of a smear spot", which is pointed out in the proposal.

SUMMARY OF THE INVENTION

The present invention has been made to overcome the conventional drawbacks, and has as its object to provide an image sensing apparatus, image sensing method, and program capable of executing proper smear correction corresponding to the image sensing purpose or condition without degrading the image quality.

It is another object of the present invention to provide an image sensing apparatus, image sensing method, and program capable of executing smear correction after proper exposure control without degrading the image quality.

To achieve the above objects, according to the first aspect of the present invention, there is provided an image sensing apparatus which senses an image by using a solid-state image sensing element, comprising a memory device which stores a smear line signal of an image sensing signal output from the solid-state image sensing element, a limiting device which limits a value of the smear line signal, and a correction device which performs smear correction of the image sensing signal on the basis of the value limited by the limiting device.

According to the second aspect of the present invention, there is provided an image sensing apparatus which senses an image by using a solid-state image sensing element, comprising a correction device which performs smear correction of an image sensing signal on the basis of a smear line signal of the image sensing signal output from the solid-state image sensing element, and a control device which performs exposure control on the basis of the image sensing signal corrected by the correction device.

According to the third aspect of the present invention, there is provided an image sensing method of sensing an image by using a solid-state image sensing element, comprising a limiting step of limiting a value of a smear line signal of an image sensing signal output from the solid-state image sensing element, and a correction step of performing smear correction of the image sensing signal on the basis of the value limited in the limiting step.

According to the fourth aspect of the present invention, there is provided an image sensing method of sensing an image by using a solid-state image sensing element, comprising a correction step of performing smear correction of an image sensing signal on the basis of a smear line signal of the image sensing signal output from the solid-state image sensing element, and a control step of performing exposure control on the basis of the image sensing signal corrected in the correction step.

According to the fifth aspect of the present invention, there is provided a program for executing an image sensing method of sensing an image by using a solid-state image sensing element, wherein the image sensing method comprises a limiting step of limiting a value of a smear line signal of an image sensing signal output from the solid-state image sensing element, and a correction step of performing smear correction of the image sensing signal on the basis of the value limited in the limiting step.

According to the sixth aspect of the present invention, there is provided a program for executing an image sensing method of sensing an image by using a solid-state image sensing element, wherein the image sensing method comprises a correction step of performing smear correction of an image sensing signal on the basis of a smear line signal of the image sensing signal output from the solid-state image sensing element, and a control step of performing exposure control on the basis of the image sensing signal corrected in the correction step.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Preferred embodiments of the present invention will be described later with reference to the accompanying drawings.

First Embodiment

Figure 1:
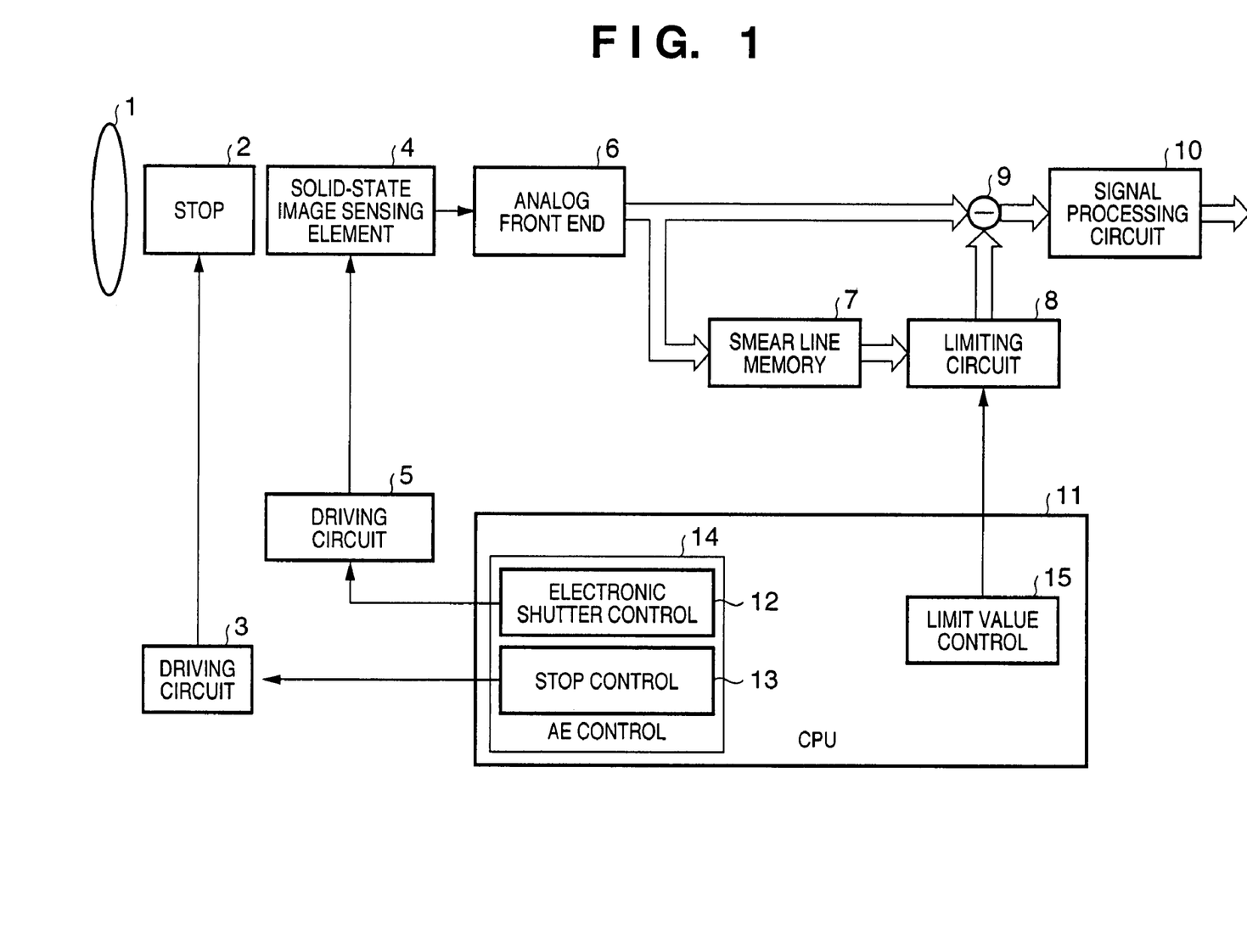
FIG. 1 is a block diagram for explaining an image sensing apparatus according to the present invention.

Reference numeral 1 denotes a lens for forming an optical image of an object; and 4, a solid-state image sensing element which converts the optical image formed by the lens into an electrical signal. Although not shown, the solid-state image sensing element 4 is comprised of a plurality of two-dimensionally arrayed photoelectric conversion circuits, a vertical transfer circuit which transfers signal charges from the respective photoelectric conversion circuits in the column direction, a horizontal transfer circuit which transfers charges transferred from the vertical transfer circuit in the row direction, and an output amplifier which outputs charges transferred from the horizontal transfer circuit.

Reference numeral 2 denotes a mechanical stop for controlling the light quantity of an optical image input to the solid-state image sensing element via the lens; and 3, a stop driving circuit for operating the mechanical stop. Reference numeral 5 denotes a solid-state image sensing element driving circuit for driving the solid-state image sensing element. The solid-state image sensing element driving circuit 5 is generally comprised of a timing generator (TG) circuit which generates a timing for driving the CCD, and a solid-state image sensing element drive circuit which converts a timing pulse generated by the TG circuit into a voltage pulse necessary to drive the solid-state image sensing element. Reference numeral 6 denotes an analog front end circuit which performs preprocessing up to digitization of an output from the solid-state image sensing element. The analog front end circuit 6 is generally comprised of a CDS circuit (Correlated Double Sampling circuit: a circuit for canceling CCD reset noise and 1/f noise), a gain circuit, and an A/D conversion circuit.

Reference numeral 7 denotes a smear line memory for storing a dummy line signal obtained by setting the number of vertical transfer stages of the solid-state image sensing element larger than the number of effective pixels sensitive to light in the vertical direction. For a plurality of dummy lines, random noise is removed by averaging of adding data of dummy lines at the same horizontal address and dividing the sum by the number of added lines. Data after removal is then stored. A signal of one of dummy lines, or a signal which is stored in the smear line memory after data of a plurality of dummy lines are averaged into data of one line will be referred to as a smear line signal or smear line data. The dummy line is a line formed by transferring signals more than sensitive pixels of the solid-state image sensing element or a light-shielding line formed by shielding the upper portion of a sensitive pixel from light (for descriptive convenience, the former will be referred to as a null read line, and the latter will be referred to as a light-shielding line, but both the lines will be referred to as dummy lines).

Reference numeral 8 denotes a smear line signal limiting circuit which clips a smear line signal at an arbitrary value. The limit value is externally set. Reference numeral 9 denotes a smear subtracter which subtracts a smear line signal output via the limiting circuit from the line signal of each signal output from the analog front end circuit 6. With the mediacy of this circuit, a signal obtained by removing a smear component from a signal containing the smear component from the analog front end circuit 6 can be input to a signal processing circuit 10.

The image signal processing circuit 10 processes an output signal from the smear subtracter 9 from which only a smear component is removed, into a brightness and color video signals (color difference signals R-Y and B-Y or R, G, and B signals). Reference numeral 11 denotes a CPU which controls the camera. The CPU functions include an electronic shutter control function 12 which controls the charge storage time of the solid-state image sensing element, a stop control function 13 which controls the light quantity incident on the solid-state image sensing element under the control of the mechanism F-value, an AE control function 14 which observes the output level of the solid-state image sensing element and keeps the incident light quantity to the solid-state image sensing element at a proper value by using electronic shutter control and stop control, and a smear line signal limit value control function 15 which observes one or both of information on the maximum value among smear lines and the signal level of the analog front end (AFE) 6 and controls the limit level of the smear line signal limiting circuit 8.

The principle of smear correction executed in the image sensing apparatus having this arrangement is equation (1), as described in BACKGROUND OF THE INVENTION. That is, a smear component is subtracted from a signal from the image sensing element. The problem, in this case, is a decrease in dynamic range (saturation) by the smear level, as shown in FIG. 7.

A problem caused by degradation by smear in commercially available DSCs at present is as follows. In the DVC or the like, white stripes at high level may appear at upper and lower portions in a partial high-brightness object (e.g., the sun, the light of a car at night, or the light of an airplane). Compared to this, a dark portion (building or normal object) below a bright portion such as the sky flares or becomes reddish. Flare appears in a normal brightness region and leads to an image in which the color balance (black balance) is lost. Only by correcting smear which degrades the normal region, the image quality of an EVF or moving image is improved to the video quality. The smear level used to correct only smear in the normal region is not so high.

Figure 2:
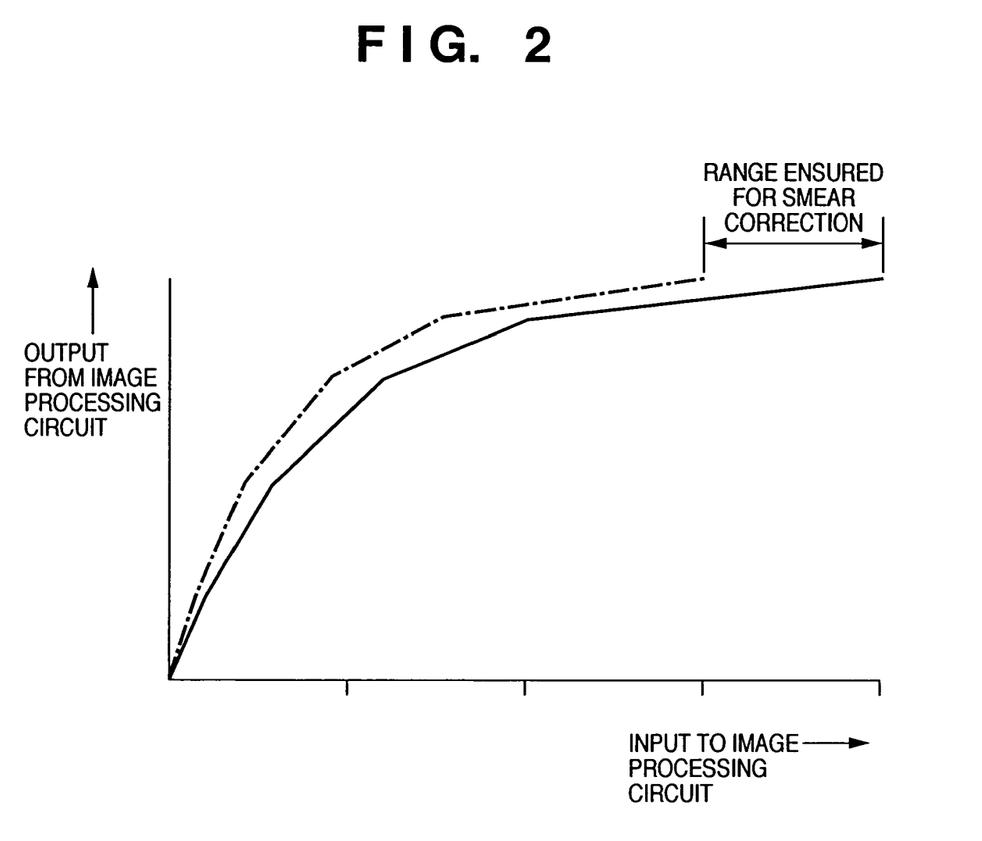
FIG. 2 is a graph for explaining smear correction according to the first embodiment.

To correct only smear in the normal region, only part of the entire grayscale of an AFE output suffices to be ensured in advance as a smear correction region. For example, when the AFE outputs a 10-bit output (1,024 LSB which will be described as 1,000 LSB for descriptive convenience), 250 LSB which is ¼ of the 1,000 LSB is used as a smear correction region, and the image signal processing circuit 10 performs processing using a signal up to 750 LSB. If tone reproduction is poor at 750 LSB, an 11-bit AD or 12-bit AD is adopted. Image signal processing is so set as to process 750 LSB as the saturation level. The limit value of the smear limiting circuit 8 can be set to 250 LSB, and smear up to 250 LSB can be corrected. Smear correction up to 250 LSB can reduce a scene which poses a problem in practical use. This will be shown in FIG. 2. FIG. 2 shows the input/output relationship of the image signal processing circuit 10. The solid line corresponds to no smear correction, and the chain line corresponds to smear correction.

Figure 3:
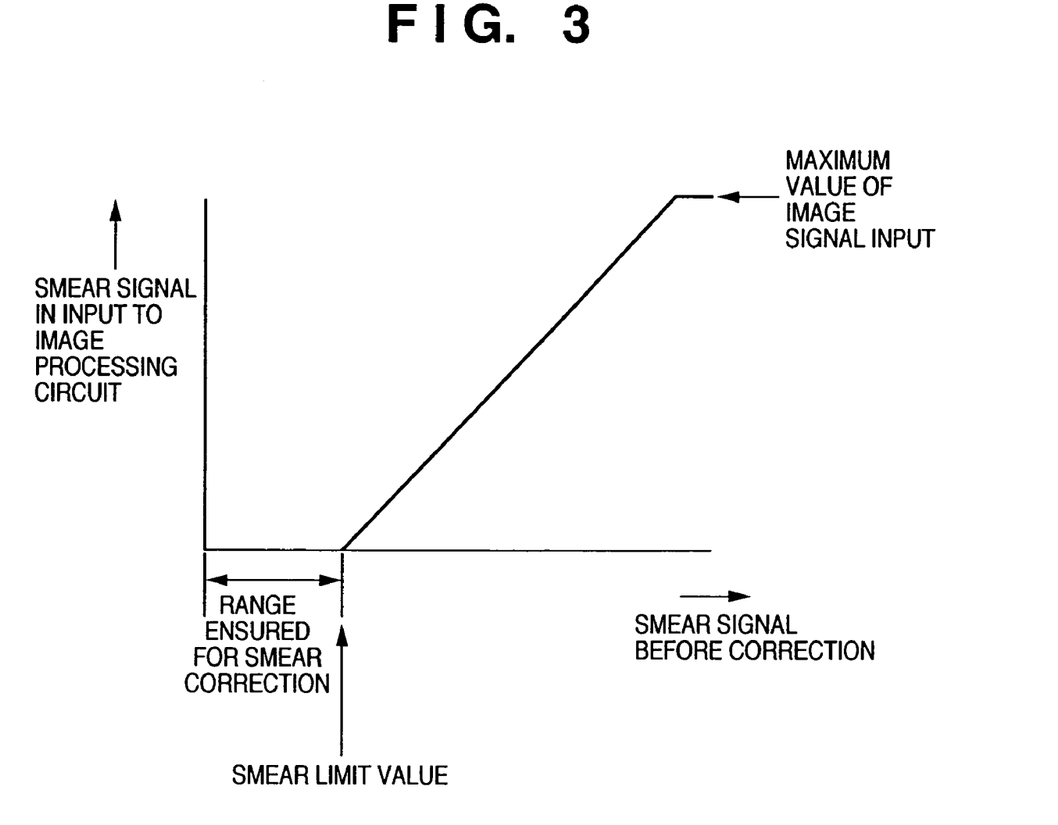
FIG. 3 is a graph for explaining smear correction according to the first embodiment.

As for a column which generates a smear amount of 250 LSB or more, 250 LSB is uniformly subtracted from each pixel output in the column. For example, when the original smear amount is 270 LSB, a smear amount of 20 LSB remains in the image, but the correction effect of correcting a bright white stripe to a light white stripe is obtained. A high-brightness object exists at a portion having a high-level smear value, and such scene is seen in the DVC or broadcasting camera, is rare, and can be allowed to a certain extent. FIG. 3 is a graph for explaining this relationship. FIG. 3 shows the relationship between smear amounts before and after smear correction. The smear amount after correction increases from a value at which the smear amount before correction exceeds the limit value, and the smear amount is 0 at the limit value or less.

In this manner, an image sensing apparatus in which smear is corrected and the smear correction amount is set to an arbitrary value to prevent degradation in image quality caused by smear in practical use can be realized.

Hence, the image sensing apparatus according to the present invention is free from the problem that "the image sensing range narrows to make the entire image dark owing to removal of a smear spot," which is caused by clipping at the maximum smear value in Japanese Patent Laid-Open No. 2001-24943 described in BACKGROUND OF THE INVENTION (see FIG. 2).

Note that the problem of making the entire image dark, which is pointed out in Japanese Patent Laid-Open No. 2001-24943, may contain another problem other than a decrease in the peak value of an image caused by a decrease in dynamic range in smear correction. This is because auto exposure control (AE) is presumably performed by a signal containing smear. AE based on an image signal containing a smear signal provides a proper level of the smear-containing image signal. This also generates an image not subjected to smear correction in which flare occurs and tone reproduction is poor. When smear correction is done for an image signal obtained by AE with an image signal not subjected to smear correction, smear is subtracted to decrease the total signal amount by smear. The image becomes darker than an image at correct exposure level (as is apparent from FIG. 7).

When the smear amount is large, the output is clipped at the maximum signal level in the conventional clipping method at the maximum smear level. The output level of the final image is determined by the maximum smear amount, and the output is saturated at a small value for a higher maximum output level. From this, an image is saturated at low level with a large smear amount and becomes dark. In the first embodiment, part of the entire grayscale is set as a smear correction region in advance, and defined as an invalid gray level of the image. This prevents degradation of the final image quality caused by reduction in the saturation of the final image in the prior art. AE is executed on the basis of a smear-corrected image, and no exposure control shift occurs upon smear correction. Accordingly, a smear-corrected image becomes a correct exposure image. An embodiment regarding AE will be described later.

In the image sensing apparatus according to the present invention, a grayscale width for smear correction and the limit value of a corresponding smear signal are set to prevent any abnormal image generated by conventional problems such as tone reproduction degradation and darkening of the final image and a decrease in the output level of a high-smear, high-brightness region. However, there is a demand for effectively using the dynamic range. To the contrary, the image sensing apparatus must be resistant to smear even with slight degradation in grayscale in some use conditions.

Figure 4:
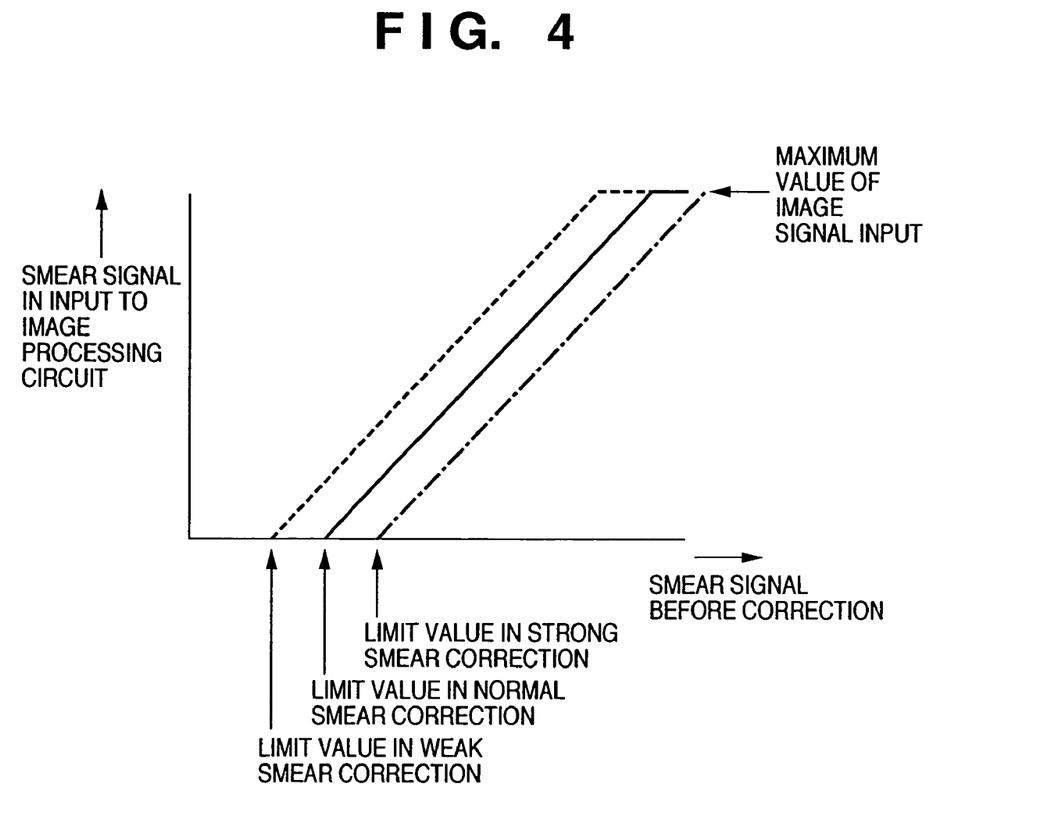
FIG. 4 is a graph for explaining smear correction according to the first embodiment.

The first embodiment externally provides a means (not shown: e.g., a setting button is arranged on the back surface of the housing of the image sensing apparatus) for setting the smear correction strength. The camera user can select the smear correction strength in accordance with a scene to be sensed. The smear correction strength can be selected by changing the limit level of the smear line signal. The limit level of the smear line signal is set high for strong smear correction and low for weak smear correction. FIG. 4 shows this state, and the difference in smear suppression by changing the limit value can be understood. The solid line represents the smear amount relationship before and after smear correction in a normal (middle) smear correction mode, the dotted line represents that in a weak smear correction mode, and the chain line represents that in a strong smear correction mode.

When the limit level of the smear line signal is to be changed, the effective grayscale range of the signal processing circuit is narrowed by the limit value of the smear line signal so as not to narrow the saturation range of the corrected portion of the final image. This means a substantial change in camera gain (as is apparent from FIG. 2 and the following description).

A case in which the upper limit of the smear line signal limiting circuit 8 is 250 LSB and the effective grayscale of image processing is 750 LSB for the above-mentioned 10-bit A/D is defined as the normal smear correction mode.

Assuming that the limit value of the smear line signal limiting circuit 8 is 350 LSB and the effective grayscale of image processing is 650 LSB in the strong smear correction mode, the camera film speed changes 1.15 times. For ISO 100 in normal correction, the camera is automatically set to ISO 115 in strong correction. Since the correct exposure amount changes when the film speed increases, control of suppressing the light quantity incident on the solid-state image sensing element by an increase in film speed is executed in the strong correction mode. Exposure control is achieved by stop control. This is because, if exposure is controlled by an electronic shutter, the light quantity incident on the solid-state image sensing element per unit time increases to increase smear.

Assuming that the limit value of the smear line signal limiting circuit 8 is 150 LSB and the effective grayscale of image processing is 850 LSB in the weak smear correction mode, the camera film speed changes 0.88 times. For ISO 100 in normal correction, the camera is automatically set to ISO 88 in weak correction. Since the correct exposure amount changes when the film speed decreases, control of increasing the light quantity incident on the solid-state image sensing element by an increase in film speed is executed in the weak correction mode. Exposure control is controlled by an electronic shutter. This is because, if exposure is controlled by an electronic shutter, the light quantity incident on the solid-state image sensing element per unit time decreases to effectively reduce smear.

In this case, the film speed difference is at a negligible level in practical use. A change in exposure/shutter speed by the film speed difference is small, and the noise difference upon a gain change is also at a negligible level.

The high-strong smear correction mode is set as a mode in which the smear correction effect is obtained even when the film speed difference and tone reproduction difference exceed negligible ranges.

For example, when the limit value of the smear line signal limiting circuit is 500 LSB and the effective grayscale of image processing is 500 LSB, the camera film speed changes 1.5 times. At this film speed, an increase in noise is recognized to a certain degree, and tone reproduction degradation comes to a recognizable level. There is also provided a mode in which an increase in noise and tone reproduction degradation are recognized by increasing the limit value, but smear correction is further strengthened. The user can select any one of noise reduction, tone reproduction, and smear strength.

In addition to setting the external setting mode, the first embodiment also changes the limit value of the smear line signal limiting circuit 8 in accordance with the setting of the camera film speed (ISO film speed).

For example, at ISO 200 setting in comparison with ISO 100 setting, the limit value of the smear line signal limiting circuit 8 is 625 LSB, and the effective grayscale of image processing is 375 LSB. In image signal processing, image processing is performed at a maximum level of 375 LSB. This is achieved by doubling the gain of data after smear subtraction on the first stage of the image signal processing circuit 10. At general ISO film speed setting, most systems double the gain by the AFE in an analog state. Some systems may increase the gain in a digital state. The first embodiment is equivalent to multiplication of a digital gain. This simultaneously doubles the smear correction strength.

At conventional high-film-speed setting by increasing the gain by the AFE, the shutter speed is often increased for high film speed to increase the smear amount. The first embodiment simultaneously increases the smear correction region in the whole grayscale. The smear amount increases due to an increase in film speed, but the smear correction strength simultaneously increases, thus reducing smear to the same degree as that at ISO 100. The film speed may be set to ISO 200 by using the total of the AFE and digital gain so as not to degrade tone reproduction too much. In particular, as the ISO film speed increases, a decrease in tone reproduction stands out. Both the digital gain and analog gain are used on the high-film-speed side, and the ratio of the analog gain increases for a higher film speed.

Figure 5:
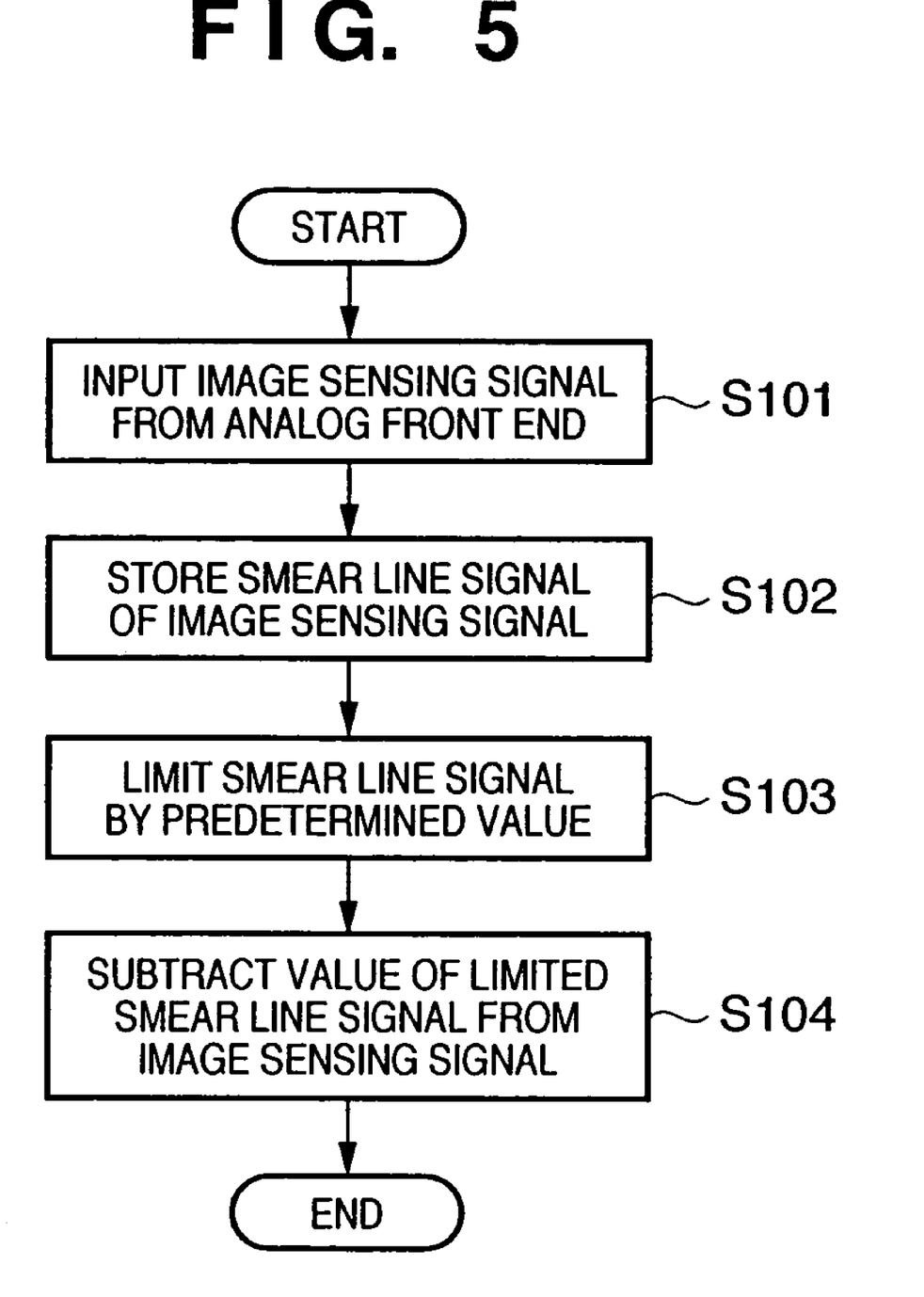
FIG. 5 is a flow chart for explaining a smear correction processing flow according to the first embodiment.

A smear correction processing sequence in the image sensing apparatus according to the first embodiment will be explained with reference to FIG. 5. This processing sequence is managed and controlled by executing by the CPU 11 a correction processing program stored in a memory (not shown).

An image sensing signal read out from the solid-state image sensing element is input from the analog front end circuit 6 (S101). Only a smear component in the image signal is extracted, and the extracted smear line signal is stored in the smear line memory 7 (S102).

The limiting circuit 8 limits the smear line signal output from the smear line memory 7 by an arbitrary value. That is, the limit value of the limiting circuit 8 is controlled by the limit value control function 15 or external setting means, as described above. The limited signal is input to the smear subtracter 9 (S103).

The smear subtracter 9 subtracts the value of the limited smear line signal from the value of an output signal from each line out of each image signal which is input from the analog front end 6 and contains a smear component. After that, the processing ends (S104).

By limiting the smear line signal for smear correction in accordance with the purpose, a high-quality input image signal can be obtained without any problem that the image sensing range narrows to make the entire image dark owing to removal of a smear spot, which is pointed out in conventional smear correction.

The usage of enhancing protection against smear though tone reproduction is impaired and noise increases can be selected in accordance with the purpose. In practice, a gain corresponding to correction grayscale determined by the smear limit value is multiplied. However, the image quality degradation such as a stripe can be prevented by adding a gain of the same value to all columns.

Second Embodiment

In the first embodiment, the limit value of the smear line signal is changed by selection of the strong/weak smear suppression mode or automatic switching corresponding to the ISO setting. In the second embodiment, the smear level is detected, and the smear limit value is changed in accordance with the smear level.

A general camera performs AE operation of maintaining correct exposure while detecting object conditions in an EVF image or moving image. The film speed is automatically increased for a dark object. Similar to this operation in the auto film speed mode, the limit value of the smear line signal is changed while the maximum smear value of the smear line signal is detected.

During photographing at the normal film speed setting, the maximum value of the smear line signal is detected to change the limit value of the smear line signal. For example, the limit value is 250 LSB for a maximum smear amount of 250 LSB and 200 LSB for a maximum smear amount of 200 LSB. In accordance with this, an image signal processing circuit 10 sets the saturation value to 750 LSB for a limit value of 250 LSB and 800 LSB for a limit value of 200 LSB.

This is substantially realized by multiplying a digital gain corresponding to a decrease in saturation due to the limit value on the initial stage of the image signal processing circuit 10.

That is, $$Siin(i,j)=(Sccd(i,j)-Sm(i))\times Sat/(Sat-Sm(\text{Max}))$$

Sm(Max): maximum value of smear line data

Siin(i,j): output on the initial stage of the image signal processing circuit

What should be noted is that the gain is changed, as described above, and the noise amount changes depending on an increase/decrease in gain. Tone reproduction also changes. This requires control of making an increase/decrease in noise and a change in tone reproduction less conspicuous.

For example, the limit change width=gain change width is restricted to a range where a change in noise or gray level does not stand out. No problem occurs as far as the limit change width is suppressed by the smear correction strength. The width employed in the strength has a relatively large value on the assumption of a high-brightness object. In practical use, the number of scenes containing high-brightness objects is small. Thus, the upper change limit of the limit value may be set to the limit value of normal or weak correction, and no lower limit need be restricted. In normal photographing, the smear amount is small, and tone reproduction is more important.

The smear detection sensitivity is set low. The smear detection sensitivity is not controlled in correspondence with the smear value of a short period such as one frame or several frames, but is controlled on the basis of the average of the smear line signal Max during a given period. The averaging period is so set as to obtain proper response characteristics.

By changing the limit value while detecting the maximum smear level, effective tone reproduction can be utilized on the basis of the smear level in actual use. If the smear level is lower than a fixed limit value in normal photographing, tone reproduction which is impaired under such conditions can be effectively utilized in the final image. Although smear increases due to the presence of a high-brightness portion, the frequency of conditions under which a high-brightness portion exists decreases at a higher brightness. For a fixed limit value, the limit value is set to a value which can satisfactorily correct smear in the presence of a slightly-high-brightness portion. In practice, an object which requires such limit value hardly appears. When the maximum variable limit value is defined as the setting value of a fixed limit value, there can be provided a camera which can photograph with an image quality at a limit value smaller than the fixed limit value, that is, tone reproduction higher than that for the fixed limit value in normal photographing, and has a smear correction strength equal to the fixed limit value.

In the above description, the limit value is controlled by detecting the maximum value of the smear line signal serving as a smear correction signal, that is, the maximum smear value. Alternatively, the limit value may be changed in accordance with the level of an image signal. The limit value is defined at an arbitrary level determined from the maximum value of an image signal or the signal level distribution. According to this method, a grayscale region applicable to smear correction is obtained from the signal level of an actual image, and the whole allowable range is used for smear correction.

A method of setting the most effective limit value in accordance with both the maximum smear value and signal level is also employed.

Third Embodiment

The third embodiment will describe in detail AE control in an image sensing apparatus according to the present invention. In AE of a smear-containing image signal, as has slightly been described in the first embodiment, the smear amount is added to original illuminance information of an actual object, and underexposure control occurs as opposed to correct exposure, resulting in a dark image. Smear correction eliminates any flare caused by smear, and the dark portion of the image further stands out.

To prevent this, AE in the image sensing apparatus according to the present invention is executed on the basis of an image signal after smear correction. AE modes include average photometry performed on the basis of the average level of the entire frame, and partial photometry performed on the basis of the average level of the central portion (in practice, a portion slightly lower than the central portion) of the frame or the average level of an arbitrarily specific region. Image data for these AE modes preferably originally contains no smear. If image data contains smear, the object is determined brighter by smear than an original one, and underexposure occurs due to smear.

To solve this problem, AE in the image sensing apparatus according to the present invention uses an output from a subtracter 9 before image signal processing (gamma processing or the like) after smear correction. With this setting, AE is executed on the basis of information which hardly contains smear, preventing underexposure on account of smear.

As the same method as the above one, the integral value of the smear amount of the entire frame region for average photometry or the integral value of the smear amount of a partial photometry region for partial photometry is calculated from an output from a limiting circuit 8 (the integral value of the smear line signal is multiplied by the total number of lines for average photometry of the entire frame, and the integral value of a corresponding partial signal out of the smear line signal is multiplied by the number of lines of the corresponding portion for partial photometry). AE is executed on the basis of data obtained by subtracting the calculated value from the integral value of photometry range data output from an analog front end 6.

However, a component which exceeds the limit value of smear and is generally negligible in an output from the subtracter remains in the subtracter 9. When an object field contains a high-brightness object, overcontrol by smear larger than the limit is performed to provide a dark image.

To prevent this, the integral value of the smear amount of the entire frame region for average photometry or the integral value of the smear amount of a partial photometry region for partial photometry is calculated from a smear line signal before limiting (the integral value of the smear line signal is multiplied by the total number of lines for average photometry of the entire frame, and the integral value of a corresponding partial signal out of the smear line signal is multiplied by the number of lines of the corresponding portion for partial photometry). AE is done on the basis of data obtained by subtracting the calculated value from the integral value of photometry range data output from the analog front end 6.

Figure 6:
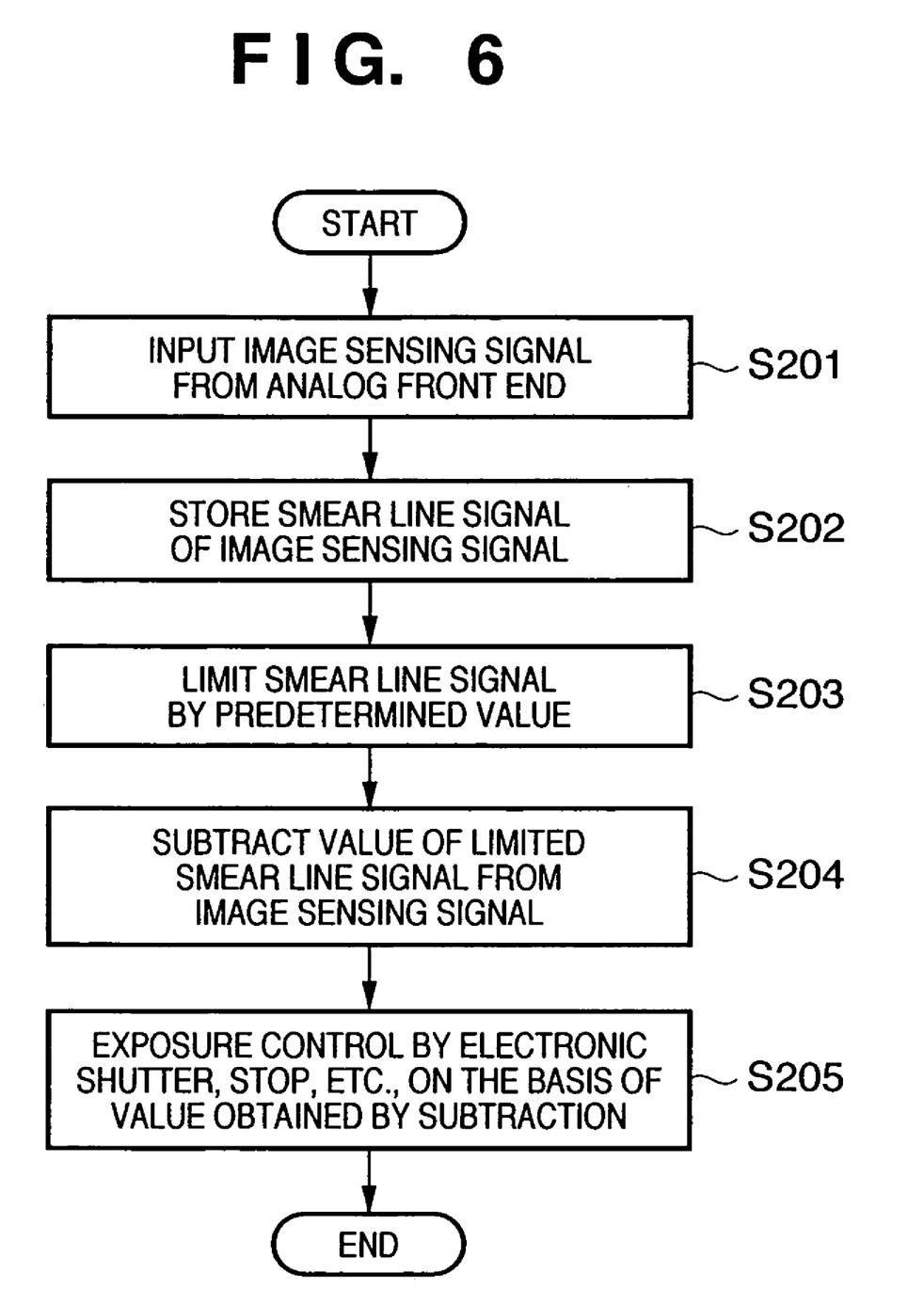
FIG. 6 is a flow chart for explaining a smear correction processing flow according to the third embodiment.

A smear correction processing sequence in the image sensing apparatus according to the third embodiment will be explained with reference to FIG. 6. This processing sequence is managed and controlled by executing by a CPU 11 a correction processing program stored in a memory (not shown).

Steps S201 to S204 are steps of performing the same processes as those in steps S101 to S104 according to the first embodiment, and a description thereof will be omitted.

In step S205, exposure is controlled on the basis of a corrected image sensing signal output from the subtraction circuit 9. That is, the electronic shutter and stop of a solid-state image sensing element are controlled on the basis of a smear-free photometric value obtained by subtracting the integral value of smear within an arbitrary range that is calculated on the basis of the smear line signal, from the integral value of the signal level within an arbitrary range of a signal not subjected to smear correction.

An image in which smear is eliminated or reduced by smear correction can be obtained by correct exposure on the basis of brightness information of an image from which smear is removed.

According to another method, protection against smear is made more effective by detecting the maximum value of the smear line signal and controlling the AE control method on the basis of the detected value. This method is mainly adopted for a fixed limit value.

AE control is performed by manipulating the stop or electronic shutter. At this time, whether to manipulate the stop or change the electronic shutter speed is determined on the basis of the maximum value of the smear line signal.

When the maximum value of the smear line signal is much smaller than the limit value in overexposure, smear correction can attain a satisfactory effect. In other words, perfect correction without any uncorrected portion can be achieved. A sufficient margin for smear is ensured to realize control by increasing the electronic shutter speed.

To the contrary, when the smear line signal is larger than the limit value, smear correction is not perfect, that is, an uncorrected component remains, and a further increase in smear is undesirable. In this case, light quantity control by the stop is executed. This is because a higher electronic shutter speed increases the smear amount. Stop control does not increase the smear amount. In practice, a decrease in smear by a change in exposure amount can be expected. In stop control, the smear reduction amount upon a change in exposure amount is directly added. In electronic shutter control, smear increases more than a decrease in exposure amount. The increase ratio becomes higher on the high-speed side.

As described above, stop priority control is done when the maximum smear value is larger than the limit value, and electronic shutter priority control is done when the maximum smear value is smaller than the limit value. This can more effectively enhance the smear resistance. In this case, a value at which the maximum smear value is slightly smaller than the limit value is safely defined as a threshold for switching between electronic shutter priority and stop priority so as to prevent the maximum smear value from exceeding the limit value after control. In any case, the limit value functions as one criterion.

As described above, the limit is set for the smear line signal used for smear correction in accordance with the purpose. An image signal level from which smear is removed is used as AE information. Accordingly, an image at correct exposure can be obtained without the problem that "the image sensing range narrows to make the entire image dark owing to removal of a smear spot," which is pointed out in conventional smear correction.

Other Embodiment

In the above embodiments, the present invention has been described by exemplifying a digital camera. However, the present invention can also be applied to another apparatus or system such as a digital video movie camera or camera-equipped cell phone.

Processing according to the present invention may be implemented as software processing executed in an information processing apparatus such as a personal computer.

More specifically, the present invention is also completed when a storage medium which stores software program codes for realizing the functions of the above-described embodiments is supplied to a system or apparatus, and the computer (or the CPU or MPU) of the system or apparatus reads out and executes the program codes stored in the storage medium.

In this case, the program codes read out from the storage medium realize the functions of the above-described embodiments, and the storage medium which stores the program codes constitutes the present invention. The storage medium for supplying the program codes includes a Floppy® disk, hard disk, optical disk, magnetooptical disk, CD-ROM, CD-R, magnetic tape, nonvolatile memory card, and ROM. The functions of the above-described embodiments are realized when the computer executes the readout program codes. Also, the functions of the above-described embodiments are realized when an OS or the like running on the computer performs part or all of actual processing on the basis of the instructions of the program codes.

Furthermore, the present invention includes a case in which, after the program codes read out from the storage medium are written in the memory of a function expansion board inserted into the computer or the memory of a function expansion unit connected to the computer, the CPU of the function expansion board or function expansion unit having the expansion function performs part or all of actual processing on the basis of the instructions of the program codes and thereby realizes the functions of the above-described embodiments.

The functions of the above-described embodiments according to the present invention are also realized when an apparatus including the storage medium is arranged in a network, the program stored in the storage medium is downloaded to a predetermined apparatus via the network, and the downloaded program is executed.

As has been described above, according to the above embodiments, proper smear correction corresponding to the image sensing purpose or condition can be executed without degrading the image quality.

According to the above embodiments, smear correction after proper exposure control can also be executed without degrading the image quality.

As many apparently widely different embodiments of the present invention can be made without departing from the spirit and scope thereof, it is to be understood that the invention is not limited to the specific embodiments thereof except as defined in the appended claims.

What is claimed is:

1. An image sensing apparatus which senses an image by using a solid-state image sensing element, comprising:
    an A/D converter which converts an analog image sensing signal output from the solid-state image sensing element to a digital image sensing signal;
    a limiting device which limits a value of a smear line signal of the solid-state image sensing element; and
    a correction device which performs smear correction of the digital image sensing signal on the basis of the value of the smear line signal limited by said limiting device,
    wherein a part of tones of the digital image sensing signal is set as a smear correction region in advance, and said limiting device limits the value for the smear line signal so that the value falls within a range of tones which is set as the smear correction region in advance.

2. The apparatus according to claim 1, further comprising an exposure control device which performs exposure control on the basis of the digital image sensing signal corrected by said correction device.

3. The apparatus according to claim 1, wherein the smear line signal is a dummy line signal output from a dummy line of the solid-state image sensing element.

4. The apparatus according to claim 1, further comprising a setting device which sets a smear correction strength, wherein said limiting device limits the value of the smear line signal in accordance with a setting by said setting device.

5. The apparatus according to claim 1, wherein said limiting device limits the value of the smear line signal in accordance with an image sensing sensitivity setting.

6. The apparatus according to claim 1, wherein said limiting device limits the value of the smear line signal in accordance with a maximum value of the smear line signal.

7. The apparatus according to claim 1, wherein said limiting device limits the value of the smear line signal in accordance with a value of the image sensing signal.

8. The apparatus according to claim 1, wherein said limiting device limits the value of the smear line signal in accordance with both a maximum value of the smear line signal and a value of the image sensing signal.

9. An image sensing method of sensing an image by using a solid-state image sensing element, comprising:
    an A/D conversion step of converting an analog image sensing signal output from the solid-state image sensing element to a digital image sensing signal;
    a limiting step of limiting a value of a smear line signal of the solid-state image sensing element; and
    a correction step of performing smear correction of the digital image sensing signal on the basis of the value of the smear line signal limited in the limiting step,
    wherein a part of tones of the digital image sensing signal is set as a smear correction region in advance, and in said limiting step, the value for the smear line signal is limited so that the value falls within a range of tones which is set as the smear correction region in advance.

10. A computer readable medium storing a computer executable program which when executed by a computer implements an image sensing method of sensing an image by using a solid-state image sensing element, the method comprising:
    an A/D conversion step of converting an analog image sensing signal output from the solid-state image sensing element to a digital image sensing signal;
    a limiting step of limiting a value of a smear line signal of the solid-state image sensing element, and
    a correction step of performing smear correction of the digital image sensing signal on the basis of the value of the smear line signal limited in the limiting step,
    wherein a part of tones of the digital image sensing signal is set as a smear correction region in advance, and in said limiting step, the value for the smear line signal is limited so that the value falls within a range of tones which is set as the smear correction region in advance.

11. An image sensing apparatus which senses an image by using a solid-state image sensing element, comprising:
- a limiting device which limits a value of a smear line signal of an image sensing signal output from the solid-state image sensing element;
- a correction device which performs smear correction of the image sensing signal on the basis of the value of the smear line signal limited by said limiting device; and
- an exposure control device which performs exposure control on the basis of the image sensing signal corrected by said correction device,
- wherein said exposure control device performs exposure control by using an electronic shutter in a case that max value of the smear line signal is not more than the value limited by said limiting device, and performs exposure control by using an aperture stop in a case that max value of the smear line signal is more than the value limited by said limiting device.

12. The apparatus according to claim 11, wherein said correction device performs smear correction of the image sensing signal by subtracting an integral value of the smear line signal within a predetermined photometry range of the input image sensing signal from an integral value of the image sensing signal within the photometry range.

13. An image sensing method of sensing an image by using a solid-state image sensing element, comprising:
- a limiting step of limiting a value of a smear line signal of an image sensing signal output from the solid-state image sensing element;
- a correction step of performing smear correction of the image sensing signal on the basis of the value of the smear line signal limited in said limiting step; and
- an exposure control step of performing exposure control on the basis of the image sensing signal corrected in the correction step,
- wherein in said exposure control step, exposure control is performed by using an electronic shutter in a case that max value of the smear line signal is not more than the value limited in said limiting step, and exposure control is performed by using an aperture stop in a case that max value of the smear line signal is more than the value limited in said limiting step.

14. A computer readable medium storing a computer executable program which when executed by a computer implements an image sensing method of sensing an image by using a solid-state image sensing element, the method comprising:
- a limiting step of limiting a value of a smear line signal of an image sensing signal output from the solid-state image sensing element;
- a correction step of performing smear correction of the image sensing signal on the basis of the value of the smear line signal limited in said limiting step, and
- an exposure control step of performing exposure control on the basis of the image sensing signal corrected in the correction step,
- wherein in said exposure control step, exposure control is performed by using an electronic shutter in a case that max value of the smear line signal is not more than the value limited in said limiting step, and exposure control is performed by using an aperture stop in a case that max value of the smear line signal is more than the value limited in said limiting step.

\* \* \* \* \*